R. SMITH.
LOCKING MEANS FOR NUTS AND BOLTS.
APPLICATION FILED APR. 28, 1915.
1,171,001.  Patented Feb. 8, 1916.
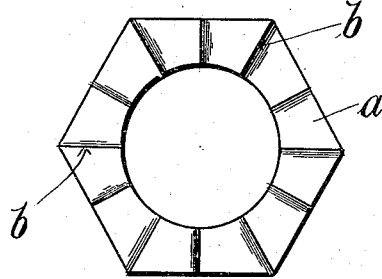
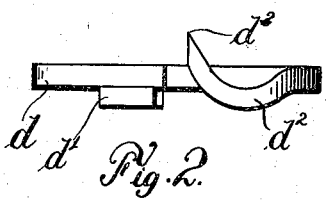
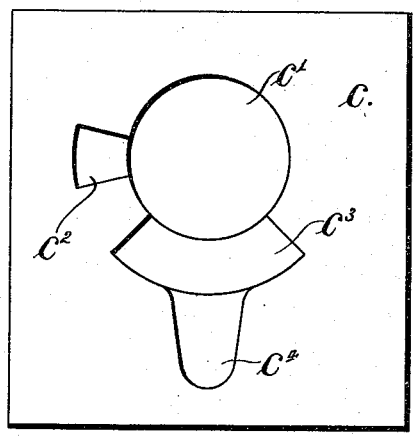
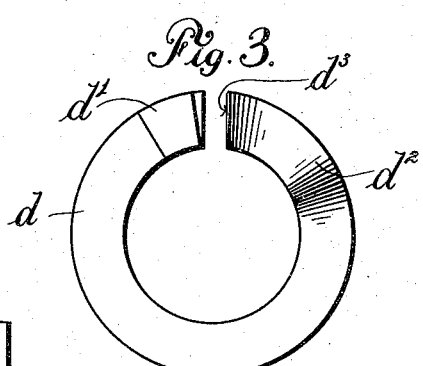
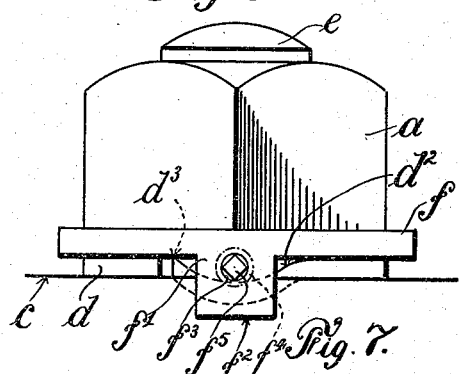
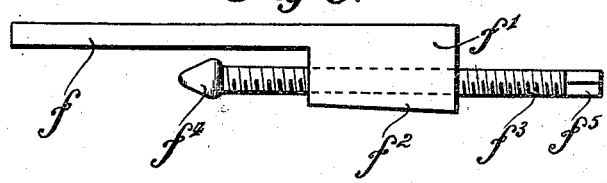
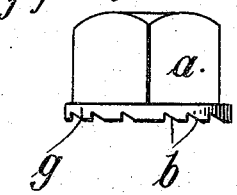
Witnesses
Arthur K. Moore
I. S. Carpenter
Inventor
Robert Smith
by Henry T. Bright
THE COLUMBIA PLANOGRAPH CO., WASHINGTON, D. C.

UNITED STATES PATENT OFFICE.

ROBERT SMITH, OF WEST STANLEY, ENGLAND.

LOCKING MEANS FOR NUTS AND BOLTS.

1,171,001.  Specification of Letters Patent.  Patented Feb. 8, 1916.

Application filed April 28, 1915. Serial No. 24,412.

*To all whom it may concern:*

Be it known that I, ROBERT SMITH, miner, a subject of the King of Great Britain, residing at 18 Gray Terrace, Oxhill, West Stanley, in the county of Durham, England, have invented new and useful Improvements in and Relating to Locking Means for Nuts and Bolts; and I do hereby declare the following to be a full, clear, and exact description of the invention, such as will enable others skilled in the art to which it appertains to make and use the same.

This invention has reference to improvements in and relating to locking means for nuts and bolts of the type in which ratchet teeth on the base of the nut engage a tooth on a split spring washer anchored to the work, means being provided for releasing the tooth from engagement with the nut when it is desired to unscrew the same.

The object and effect of this invention is to produce a means whereby a nut may be securely locked on a bolt, but which will also allow it to be removed easily, and used again without in any way damaging the bolt or the nut or the locking means or the surface against which it bears.

A locking device for nuts according to this invention comprises in combination a split spring washer provided on its under surface with one or more dovetailed projections, and a dipped portion near one end from which the said end rises to form an upstanding part which engages with radial cuts formed in the underside of the nut. The face of the metal against which the washer contacts is formed with a slot arranged concentric with the bolt hole and a dovetailed recess or recesses to receive the aforesaid similarly shaped projection or projections on the undersurface of the split spring washer and a sloping and grooved approach to the aforesaid slot and means for disengaging the said upstanding end of the split spring washer from the said radial cuts in the nut.

The invention is more particularly set forth in and by the following description which is made in connection with the accompanying drawings in which the invention is shown.

Figure 1 is a view of the underside of the nut. Fig. 2 is a front view of the washer. Fig. 3 is an underneath view of the washer. Fig. 4 is a plan of the face for receiving the washer. Fig. 5 is a front view of a nut with the unlocking mechanism in place. Fig. 6 is a side view of the unlocking mechanism. Fig. 7 is a side view of a modified form of nut.

The nut $a$ is provided with radial cuts $b$ on its underside one side of each cut being sharp and one side being inclined so as to allow a projection to pass over the cuts when the nut is turned in one direction, and to prevent the nut running back in the opposite direction.

The faces of the material $c$ against which the nut $a$ is to be screwed and which may be a separate plate attached to the face or may be cut in the actual material to be secured is provided with a hole $c'$ for the bolt with a dovetail slot or slots $c^2$ and a recess $c^3$ which is approached by a sloping groove $c^4$.

The washer $d$ shown in detail in Figs. 2 and 3 is split and has on its underside one or more dovetailed projections $d'$, and a dipped portion $d^2$ which rises up into a projecting end with a sharp edge $d^3$.

When it is desired to use the locking device the bolt $e$ is put through the hole $c'$ and the washer $d$ is put over it so that the projection $d'$ falls into the slot $c^2$; the dip $d^2$ will then be in the recess $c^3$ with the edge $d^3$ upstanding. The nut $a$ is now screwed down on the bolt $e$ the sloping edges of the cuts $b$ allowing it to be turned in one direction only as soon as its under face comes in contact with the projecting end of the washer $d$. When the nut $a$ is fully home the edge $d^3$ of the washer is level with the top of the washer $d$ and pressing hard against the underside of the nut and thus preventing it from turning back, the dip $d^2$ being forced into the recess $c^3$. When it is desired to remove the nut $a$ the dip $d^2$ is forced a little lower into the recess $c^3$ thus bringing the edge $d^3$ out of contact with the underside of the nut $a$ which may thus be unscrewed in the ordinary way. In order to render this depressing of the dip $d^2$ easier and to prevent during the operation, damage to the nut a special device is provided in the form of a ring $f$ and tail piece $f'$ which latter has a lug or projection $f^2$ below it in which moves a screw $f^3$ with a bull nose $f^4$ and a turning end $f^5$.

When it is desired to release a nut locked in accordance with this invention, the perforated member $f$ is slipped over the nut $a$ as in Fig. 5 so that the bull nose $f^4$ is in the recess $c^4$ of the face $c$. The screw $f^3$ is then turned by the end $f^5$ and the bull nose $f^4$ is advanced till it forces down the dip $d^2$ and hence the edge $d^3$. In order to allow the more easy turning of the nut $a$ when fitted with this releasing means the bottom part of the nut $a$ may be round as at $g$ Fig. 7 instead of having flats cut in it as on the other part and then it may be easily turned while the ring and tail piece are in place.

What I do claim as my invention and desire to secure by Letters Patent is:—

A nut lock comprising a split spring washer provided on its under surface with a dovetailed projection, a dipped portion near one end of the washer from which the said end rises to form an upstanding part, a nut having radial cuts formed on its under side with which said upstanding parts of the washer are adapted to engage, and a member against which the split washer contacts, said member being provided with a dovetailed recess to receive the dovetailed projection on the under surface of the split washer and further having a second recess to receive the dipper portion of the washer and to permit the upstanding part to be moved out of engagement with the radial cuts of the nut.

In testimony whereof I have signed my name to this specification in the presence of two subscribing witnesses.

ROBERT SMITH.

Witnesses:
JAMES CROSSMAN,
JOSEPH CROSSMAN.

Copies of this patent may be obtained for five cents each, by addressing the "Commissioner of Patents, Washington, D. C."